Figure 1:
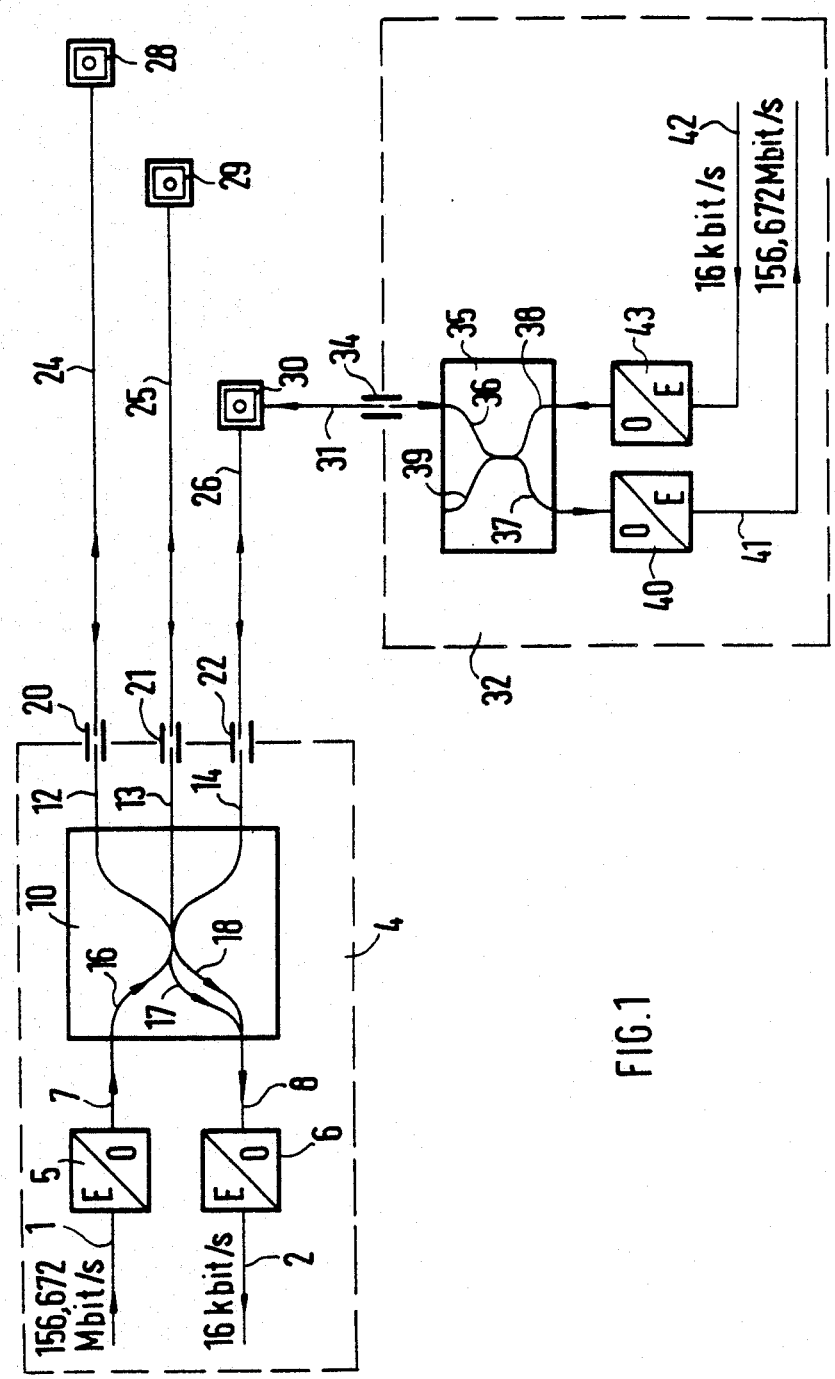

United States Patent [19]

Mohr

[11] Patent Number: 4,748,689
[45] Date of Patent: May 31, 1988

[54] FIBER-OPTIC DISTRIBUTION SYSTEM FOR BROADBAND SIGNALS

[75] Inventor: Friedemann Mohr, Renningen, Fed. Rep. of Germany

[73] Assignee: Alcatel, N.V., Amsterdam, Netherlands

[21] Appl. No.: 889,976

[22] Filed: Jul. 24, 1986

[30] Foreign Application Priority Data

Aug. 7, 1985 [DE] Fed. Rep. of Germany ....... 3528252

[51] Int. Cl.$^4$ .............................................. H04B 9/00
[52] U.S. Cl. .................................. 455/612; 455/607; 370/3; 350/96.15
[58] Field of Search ............... 455/612, 606, 607, 617; 350/96.15; 370/3

[56] References Cited

U.S. PATENT DOCUMENTS

| | | | |
|---|---|---|---|
| 4,446,515 | 5/1984 | Sauer et al. | 455/612 |
| 4,481,621 | 11/1984 | Schmack et al. | 455/612 |
| 4,506,356 | 3/1985 | Krull | 370/1 |
| 4,525,834 | 6/1985 | Shenkel et al. | 370/3 |
| 4,545,048 | 10/1985 | Hauk et al. | 370/1 |
| 4,646,361 | 2/1987 | Usui | 455/607 |

FOREIGN PATENT DOCUMENTS 0024618 6/1983 European Pat. Off.
3439399.4 10/1984 Fed. Rep. of Germany.

OTHER PUBLICATIONS

"Full Duplex Transmission Link over Single Strand Optical Fiber" Optics Letters, vol. 1, #3, Sep. 1977; Kawasaki et al, pp. 107–108.

*Primary Examiner*—Robert L. Griffin
*Assistant Examiner*—Leslie Van Beek
*Attorney, Agent, or Firm*—Christie, Parker & Hale

[57] ABSTRACT

A fiber-optic distribution system is disclosed which distributes broadband signals received by a network termination circuit from a broadband communications network (B-ISDN or cable-television network) among a plurality of subscriber terminals. The network termination circuit (4) contains devices for separating a forward channel and a backward channel. It also includes electric-to-optical and optical-to-electric transducers (5,6). The distribution system contains a fiber-optic multi-port coupler (10) which is made by the fusion technique and interconnects a plurality of optical fibers (12, 13, 14). On the subscriber's side, each of these optical fibers forms the forward channel and the backward channel for one of the terminals (32). On the network side, one of these optical fibers (16) forms the forward channel for the broadband signals, and all other optical fibers (17, 18) are combined to form the narrow-band backward channel. They are connected to a common large-area photodiode (6). As the backward channel is a narrow-band channel, the fact that large-area photodiodes, such as PIN diodes, are relatively slow does not cause any bandwidth problems.

3 Claims, 2 Drawing Sheets

FIBER-OPTIC DISTRIBUTION SYSTEM FOR BROADBAND SIGNALS

The present invention relates to a fiber-optic distribution system for broadband signals transmitted from a communications network through a network termination circuit to a plurality of subscriber terminals, the network termination circuit containing electric-to-optical and optical-to-electric transducers and devices for separating a forward channel and a backward channel and for distributing the broadband signals to the individual terminals.

In a prior art distribution system, the broadband signals are transmitted in the public communications network over optical waveguides, while on the subscriber's side the network termination circuit ("interface circuit") is connected to sockets of the individual terminals by a coaxial line. See published European Patent Application No. 0024618 dated June, 29, 1983 and naming Bauch as inventor. A prior application describes an in-house distribution facility in which the communications network contains optical waveguides, too, and in which the interface circuit is connected to the individual subscriber terminals by an in-house communication bus. See commonly assigned published German patent application P. No. 34.39399 filed on Oct. 27, 1984 and naming H. Reiber and G. Linsenmaier as inventors. In view of the current cabling policy, however, the public network is likely to be expanded to a certain extent with conventional electric subscriber lines for some time. In the installation on the subscriber's side, however, fiber-optic technology, which meets the requirements of the future, can be used already now.

The object of the invention is to provide a distribution system for broadband signals in which the latter are transmitted in the subscriber area over optical waveguides.

According to the invention, this object is attained by a distribution system of the above kind which includes a fiber-optic multiport coupler interconnecting a plurality of optical fibers which are fused together in the fiber-optic multiport coupler and each of which forms the forward channel and the backward channel for one of the terminals on the subscriber's side, while on the network side, one of the optical fibers forms the forward channel for the broadband signals and all other (number n-1) optical fibers are combined to form the narrow-band backward channel.

Further advantageous aspects of the invention are characterized in the subclaims.

The principal advantages of the invention are that the need for a separate line for the backward channel from the terminals to the communications network is eliminated, and that the sensitivity of the optical receivers is utilized in an optimum fashion.

Figure 2:
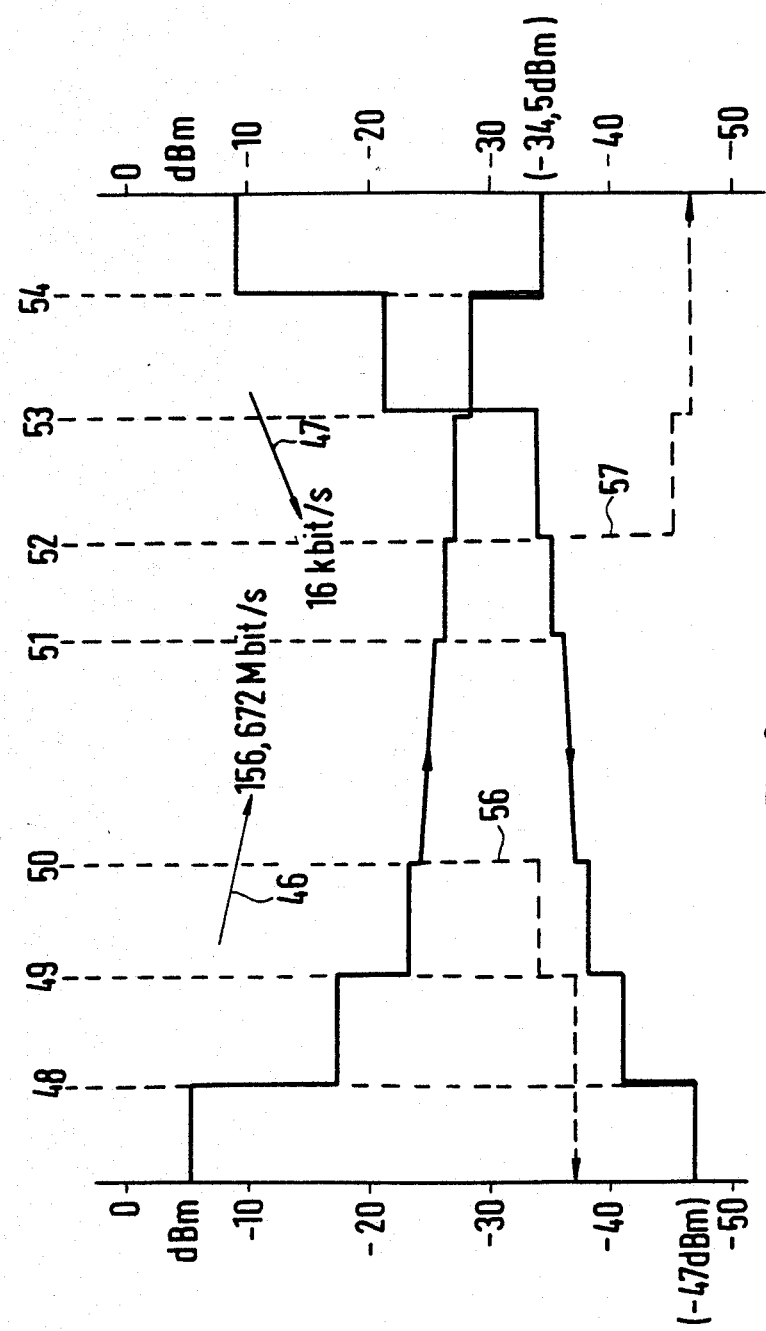

An embodiment of the invention will now be explained with reference to the accompanying drawings, in which:

FIG. 1 shows a fiber-optic distribution system in accordance with the invention, and FIG. 2 shows an overall loss plan of the distribution system of FIG. 1.

The subscriber line of a broadband communications network, such as a B-ISDN or a cable-television network, consists of a first line 1, which forms the broadband forward channel, and a second line 2, which forms the narrowband backward channel. Over the line 1, television signals, for example, are transmitted to the subscriber terminals, while the line 2 serves to transmit selection signals from the subscriber to the exchange with which a television program selected by the subscriber from a plurality of programs offered at the exchange is switched to the subscriber.

The subscriber line consisting of the lines 1, 2 ends in the subscriber's house or office in a network termination circuit 4, which is also referred to as "interface circuit". The network termination circuit 4 contains an electric-to-optical transducer 5, to which the line 1 is connected, and an optical-to-electric transducer 6, to which the line 2 is connected.

Each of the transducers 5, 6 is connected to a fiberoptic multiport coupler 10 by an optical waveguide 7, 8. This multiport coupler 10 performs a dual function: Firstly, it serves to separate the forward channel and the backward channel, and secondly, it serves to distribute the broadband optical signal to the various terminals.

The directions of transmission are indicated in the drawing by arrows, with the forward channel for the television or other video signals running from left to right and from the top to the bottom, and the backward channel from right to left and from the bottom to the top.

The multiport coupler 10 is of symmetrical design. It is formed by fusing a number n of optical fibers together in a limited region. Different types of optical couplers made by fusing or welding optical fibers together are known (cf. "Elektrisches Nachrichtenwesen", Vol. 55, No. 4, 1980, pp. 342 to 349). In the embodiment being described, the number n of optical fibers interconnected by the multiport coupler is 3. The multiport coupler must be of symmetrical design to ensure that the optical signal coupled in via the optical fiber is evenly distributed among the three outgoing optical fibers 12, 13 and 14, so that all connected terminals are supplied with the same optical power. The symmetry of the forward channel, i.e., the even distribution of the signal incoming on the optical fiber 7 among the three outgoing fibers 12, 13, and 14, calls for the same symmetry in the reverse direction. The backward-channel signals incoming on any of the optical fibers 12, 13 and 14 are evenly distributed among the optical fibers 16, 17 and 18, located in the drawing to the left of the fusion region. According to the invention, not only one of the optical fibers 16, 17 and 18 is used for the backward channel, but n-1 optical fibers 17, 18 are combined for this purpose, while one optical fiber, 16, serves to couple in the broadband signal. Since, in the embodiment shown, n=3 and n-1=2 for simplicity, the two optical fibers 17 and 18 are combined and connected jointly to a large-area photodiode forming the optical-to-electric transducer 6. There, n-1 times as much light is then available as if only one fiber were used for the backward channel, so that the noise in the received backward-channel signal is reduced. As the backward-channel signal is usually a narrow-band signal, the use of a large-area diode, which is slower than a small-area diode, has no disadvantages with respect to the bandwidth to be transmitted.

The optical fibers 12, 13 and 14 end in optical connectors 20, 21, and 22, which form the outputs of the network termination circuit 4 on the subscriber's side. From each of these outputs, an optical fiber 24, 25, 26 runs to a socket 28, 29, 30, to which a subscriber terminal can be connected.

In the drawing, a line transceiver 32 forming part of a television receiver suitable for receiving optically transmitted video signals is connected to the socket 30 by an optical fiber 31. Connected to an optical connector 34, which forms the input/output of the line transceiver 32, is an optical 2×2 coupler 35. This coupler 35 is of unsymmetrical design for optimum utilization of the sensitivity of the optical receiver. Most of the optical power incoming on the optical fiber 31 is transferred in the coupler 35 from an optical fiber 36 to an optical fiber 37 and from the latter to an optical-to-electric transducer 40. This transducer converts the optical video signal to an electric digital video signal which is transmitted over a line 41 to the input of the television receiver proper (not shown). From the television receiver, the control signals of the narrow-band backward channel are transmitted over a line 42 to an electric-to-optical transducer 43, whose optical output signal enters an optical fiber 38 of the optical coupler 35. As a result of the asymmetry of this coupler 35, most of the optical power of the backward-channel signal is transferred to a fourth optical fiber 39 of the coupler 35, which is terminated by a reflectionless termination. The smaller portion of this signal, which is transferred to the optical fiber 36, is sufficient to proceed through the network termination circuit 4 to the communications network and to be received in the associated exchange.

The overall loss plan of FIG. 2 shows the optical power levels available at individual points of a fiber-optic distribution system in accordance with the invention. The staircase curve from the upper left to the lower right relates to the broadband forward channel—this is indicated by an arrow 56—, while the staircase curve from the upper right to the lower left relates to the narrow-band backward channel—as is indicated by an arrow 47. At a point 48, the broadband optical signal is coupled into the fiber-optic distribution system. This point corresponds to the output of the electric-to-optical transducer 5 of FIG. 1, which is a light-emitting diode (LED) with an operating wavelength of 850 nm. A point 49 corresponds to the output of the fiber-optic multiport coupler 10, and the power available at the outputs of the connectors 20, 21, 22 is shown at 50. A point 51 corresponds to the outputs of the sockets 28, 29 and 30, with the fall of the curve between the points 50 and 51 representing the loss over 100 m optical fiber. A point 52 corresponds to the input of the connecter 43 of the television set, and the power at the output of the four-port coupler 35 is shown at a point 53. The system's power reserve is shown at a point 54: a minimum receive level of −34.5 dBm was assumed here. For the backward channel, the power levels are shown at the same points of the distribution system. The optical power is coupled in at the point 54, which corresponds to the output of the electric-to-optical transducer 43 of FIG. 1, a LED with an operating wavelength of 850 nm. The system's power reserve is shown at the point 48, which corresponds to the input of the optical-to-electric transducer 6 of FIG. 1. Here, the minimum receive level is −47 dBm.

At any optical connector, even if the connector is fabricated with utmost care, reflection occurs, and part of the optical signal travels back in the opposite direction. The optical power reflected at the connectors 20, 21, 22 is shown by a dashed curve 56. As can be seen, the level of the reflected forward signal is clearly higher than the receive level of the signal of the backward channel. The spectral centroids of the power distribution of the broadband forward signal and the narrowband backward signal are spaced a great distance apart, and because of the receiver's spectral selectivity, the reflected signal causes no interference in the backward channel. Crosstalk can also be suppressed simply by low-pass filtering.

Analogously, the backward-channel signal is reflected at the connector 34 (point 52 in FIG. 2). The level curve of this reflected signal is shown by a dashed line 57. Here, the signal level received in the terminal is considerably below the required minimum signal level and can additionally be suppressed by suitable filtering, so that the broadband forward signal will not be affected by the reflected signal.

I claim:

1. In a fiber-optic distribution system for broadband signals transmitted from a communications network to a plurality of subscribers and for narrowband signals transmitted from the individual subscribers, a network termination circuit for use with at least three subscriber terminals, the network termination circuit comprising:

a multiport optical coupler for separating a forward communications network channel and a backward communications network channel and for distributing the broadband signals to, and the narrowband signals from, each of at least three individual terminals, said fiber-optic multiport coupler (10) being made by fusing, and at least three optical fibers each having a subscriber end which forms at least a portion of both the forward broadband channel to and the backward narrowband channel from one of the subscriber terminals, wherein:

the other end of at least one of the optical fibers remote from its respective subscriber end forms the forward channel for the broadband signals from the communications network to the coupler, and at least two other ends of the remaining optical fibers are optically combined to form the narrow-band backward channel.

2. A distribution system as claimed in claim 1, wherein, on the network side, said remaining optical fibers are connected to a common large-area photodiode (6).

3. A distribution system as claimed in claim 1, wherein each of the subscriber terminals is connected via an unsymmetrical four-port coupler (35) to its associated one of said n optical fibers.

* * * * *